United States Patent Office 3,541,203
Patented Nov. 17, 1970

3,541,203
PROTECTED VIRUS COMPOSITION
FOR INSECT CONTROL
Mark V. Fogle, Lewisburg, and David G. Peyton, Miamisburg, Ohio, assignors to The National Cash Register Company, Dayton, Ohio, a corporation of Maryland
No Drawing. Filed May 8, 1969, Ser. No. 823,172
Int. Cl. C12k 1/08
U.S. Cl. 424—17
12 Claims

ABSTRACT OF THE DISCLOSURE

A process is disclosed for providing viruses, specifically insect viruses, in an improved form wherein the viruses can be applied in an agricultural area and can exhibit a sustained or prolonged effectiveness at a predetermined viral dosage. Moreover, such an improved virus form is disclosed as a composition wherein the virus is protected from environmental conditions;—especially from actinic radiation, such as the portion of white light in the ultraviolet wave length range. In one preferred embodiment, a virus and an ultraviolet absorbing material are contained within a matrix of polymeric material, and the matrix is divided into minute particles. Release of the virus is occasioned by some matrix-breaching force such as by grinding pressures or by solution or degradation of the matrix material. A specific, preferred, composition includes Nuclear Polyhedrosis Virus, carbon black and ethylcellulose combined to afford minute particles of virus and carbon black in an ethylcellulose matrix.

BACKGROUND OF THE INVENTION

Field of the invention

This invention relates to insect control and to killing insects which infest growing plants in agricultural areas. It further pertains to insect control wherein insect pests are mortally infected by viruses of a particular kind. Viruses used to infect the insect pests are, in the practice of this invention, employed as one component in a novel composition which permits sustained effectiveness of the viruses over a relatively long period of time and which also provides protection from actinic radiation to impede deactivation of the viruses under normal conditions of use.

It has become increasingly apparent, in the past several years, that some form of insect control is very important to enable increased crop yields in agricultural areas of the world. Insect pests, at the present time, significantly reduce the yield of certain crops in the United States. As one specific example, *Heliothis zea,* the corn earworm (also known as the cotton bollworm, the tomato fruitworm and the soybean podworm) attacks a large variety of crops including corn, tobacco, beans, vetch, alfalfa, cotton and various flowers and garden plants. In some years, it has been estimated that *H. zea* has attacked from 70 to 98 percent of the ears of field corn in the United States. It has been estimated that *Heliothis zea* has attacked and eaten as much as 5 to 7 percent of the kernels of field corn during those years. Moreover, the insects which infest growing plants can also be carriers of molds and fungi which result in diseased crops and may even cause death among livestock feeding on those crops.

Chemical insecticides have been used for many years with good results in insect control but with side effects which have been considered to be undesirable and, in some cases, prohibitive. After continued use of a particular chemical insecticide, the insects to which the chemical has been applied have been known to develop an immunity to it. Over the duration of a few generations of insects, many chemical insecticide compositions must be modified or changed altogether in order to provide effective, continued, means of control for those insects. Also, there is growing alarm in the use of indestructible or relatively indestructible compositions, such as DDT, (1,1,1-trichloro-2,2-bis-(para-chlorophenyl)ethane), and other common chemical insecticides, wherein the insecticide materials survive the natural cycles of life and death in plants and animals and are concentrated in certain living organs or roots which are, in turn, eaten by other animals or absorbed by other plants. The concentration of those indestructible chemicals is thereby increased to a point where the insecticide may reach a level at which it serves as a poison to things not intended to be effected. In the use of chemical insecticides, much care must be exercised so that crops are not unduly contaminated or overdosed with the insecticide material. Care must be taken that animals are not brought into contact with the insecticide composition and that "blow-off" of the insecticide does not fall where its presence is not desired. All of these things, and others, point to an increasing disenchantment with formerly-used chemical insecticide compositions—compositions which serve a very useful purpose, but which exhibit consequent detracting effects which lessen their overall value.

Insects, like almost all other living organisms have been found to be subject to diseases. Specifically, there are certain viruses which infect insects and which, in a proper concentration and under proper conditions, mortally disease the insects. Viruses have been found to be very effective in killing insects and also to be very specific in their infection. That is, certain viruses have been found to infect and kill only certain insects. Moreover, it has been discovered that very little virus material is necessary to cause mortal disease in many insects.

Viruses have been found to be easy to apply to insects; for example, the viruses being combined with food for the insects so that the viruses are ingested at the time that the insect begins its destruction on plant crops. The viruses are believed to have little effect on other living organisms. The viruses are completely destroyed or degraded by natural forces and, so, are not concentrated by surviving natural life cycles. The viruses, being a kind of parasite product of the insects which they infest, are not expected to become ineffective over a duration of a few insect generations because it is believed that the viruses will undergo change in parallel with any changes evolved in the insect host. In many cases, viruses have been found to be more desirable as means for insect control than the chemical insecticides which they replace.

Actual field tests have shown, however, that insect viruses, when applied in a test agricultural area of growing plants, quickly become ineffective as an insect infecting agent. It is believed that one factor in the rapid deactivation of such viruses, once applied, is exposure of the viruses to actinic light, that is, to a portion of the sunlight spectrum which causes photo-reactions. In the case of the deactivation of viruses, the actinic portion of the sunlight spectrum is believed to be especially in the wave length range of the ultraviolet. Other factors in the virus deactivation, of course, reside in their exposure to temperature extremes, adverse moisture conditions, various chemical and bacterial characteristics of the soil, and the like.

A composition has now been invented which includes: a virus to be used as an insecticide; and protecting materials which aid in prevention of the deactivation of the viruses and which prolong the effectiveness of the viruses. The composition of the present invention has insecticidal properties much improved over viruses of the past.

Description of the prior art

United States Patent No. 3,317,393 issued May 2, 1967 to the United States of America on the application of Robert M. Chanock et al. discloses a live virus contained within a capsule. The virus, however, is one which causes human respiratory infections or, broadly, adenoviral infections. The capsules disclosed therein are common telescoping, hard gelatin, capsules coated with an enterically-active cellulose acetate hydrogen phthalate film. In the virus composition of the above-named patent there is no provision for protection of the virus from inactivation by actinic radiation. Nor is there even a suggestion that such inactivation might occur.

U.S. Pat. No. 3,197,369 issued July 27, 1965, to R. P. Scherer on the application of Arno Widmann et al. discloses what are named coated gelatin capsules wherein the coating provides protection from ambient tropical temperatures. There is, of course, no hint in the above-named patent that protection from ultraviolet or actinic radiation is desired or that the coatings laid down on the gelatin capsules absorb or reflect actinic radiation. There is no mention in the patent of viruses or viral compositions.

U.S. Pat. No. 2,946,724, issued July 26, 1960 to American Cyanamid Company on the application of William Valentine discloses a stabilized form of live poliomyelitis virus in combination with small particles of gelatin. The patent, however, does not disclose a sensitivity of the virus to actinic radiation; and, of course, there is no indication of the use of actinic radiation-absorbing or reflecting material to protect the virus. Even if the stabilized virus-gelatin combination were encapsulated, the virus-containing product would be vastly different from the product of the present invention.

A textbook titled "Techniques in Experimental Virology," edited by R. J. C. Harris and published by the Academic Press (1964), includes a discussion of the state of the art with respect to viruses. Chapter 4 of that book, written by G. H. Bergold, is specific to insect viruses.

SUMMARY OF THE INVENTION

As has been previously stated, the use of viruses for insect control is not particularly new. It was previously recognized that insect viruses mortally infect specific insects. Such viruses can be collected from infected insects, concentrated, formulated, and applied in particular ways to infest other insects and thereby control an insect population. The viruses and the results achieved from viral infections are believed to be relatively specific to certain insects. Because of that specificity, residual amounts of the insecticidal virus preparations present no problem. Moreover, the viruses are inactivated and degraded after a relatively short time in the normal environment of use.

There are at least four groups or categories of insect viruses which are apparently eligible for use in the practice of the present invention. In order to present preference for use in preferred embodiments of the invention, the insect viruses are identified as follows:

(1) Nuclear polyhedrosis viruses.—These polyhedrosis viruses attack the larvae and pupae of the insect orders Lepidoptera, Heymenoptera, Neuroptera, and Diptera. As is well-known, the above-named orders include many varied and destructive insects. For example, in the order of Lepidoptera, there are included: carpenter moths, the larvae of which feed on the solid wood of deciduous trees, and herbaceous plants; codling moths; and owlet or cutworm moths. The family of cutworm moths (Noctuidae) include such devastating insects as the army-worm, stalk-borer, corn earworm or bollworm, cotton leaf worm, tobacco bugworm, cabbage looper, cabbage webworm, and, of course, the cutworms. The nuclear polyhedrosis viruses are characterized by being polyhedral in shape and by containing rod-shaped virus particles within the confines of each polyhedron.

(2) Cytoplasmic polyhedrosis viruses.—These viruses attack the larvae of many of the insects of the orders of Lepidoptera and Isoptera. These viruses are characterized by being polyhedral in shape and by containing spherical virus particles in each polyhedron.

(3) Granulosis viruses.—These viruses attack the larvae of insects of the order Lepidoptera and are characterized by having a granular shape and by usually having one rod-shaped virus particle in each granule.

(4) Non-inclusion viruses.—These viruses attack insects of the orders Lepidoptera, Hymenoptera, Diptera, and Coleoptera and are characterized by the lack of virus inclusion bodies. The virus particles in this group are either spherical or polyhedral in shape and are not enclosed.

Viruses used in practice of the present invention can be collected from diseased insects and can be multiplied in laboratory cultures maintained under the proper conditions. Viruses to be collected from diseased insects can be separated from crushed and dried virus-containing insects and can be purified by, for instance, repeated immersion and centrifugation in water. Collection, multiplication, and purification of insect viruses is a subject of the prior art such as is disclosed in the above-referenced book titled "Techniques in Experimental Virology."

It has been found that viruses enclosed within inclusion bodies are relatively stable to some rather extreme environmental conditions; and that viruses, when free from their surrounding membrane, are sensitive to environmental conditions, such as change in temperature, change in pH, or moisture conditions. Despite belief in the past that viruses within their inclusion bodies were stable to actinic radiation, especially to ultraviolet radiation, in early attempts at controlling insects by the use of insect viruses, a high concentration of the virus was required because of the very rapid deactivation of the virus with regard to a capability to infect insects.

It has been found that unprotected virus, applied to growing plants with the object of infecting insect pests, has been quickly deactivated and is ineffective shortly after application. It is believed that a reason for the deactivation is that sunlight, or some portion of the spectrum of sunlight, deactivates virus to render it ineffective in infecting insect pests. In this disclosure, that portion of the sunlight which causes reaction and consequent deactivation of the viruses, has been termed "actinic." Particularly and most specific of the portion of the spectrum of sunlight which is referred to herein as actinic, is believed to be the ultraviolet, that is, light in the wavelength range of from about 3900 to about 100 Angstrom units. The composition of the present invention is manufactured in such a manner as to protect the viruses from light of whatever wavelength by using or including actinic light absorbers and/or reflectors into the composition. In some embodiments of the novel virus-containing composition, there is a polymeric matrix or enclosing material which holds the virus in close position to the light absorbing material. The polymeric matrix material is finely divided on the order of about 5 to about 50 microns or larger and contains, in at least one embodiment, the virus and the ultraviolet light absorbing material in substantially homogeneous mixture.

It is an object of the present invention to provide a virus composition useful for infecting insects which infest growing plant crops in agricultural areas.

It is more specifically an object of the present invention to provide such a virus composition wherein the virus of the composition is protected from deactivation by actinic light. More specifically, it is an object of the present invention to provide such a virus composition wherein the viruses are protected from actinic light by having provided, in the composition, an actinic light absorber or reflector. Actinic light with which the composition is especially concerned is light in the wavelength range generally considered to be ultraviolet light.

It is a further object of the present invention to provide such a virus composition as described above in the form of a sprayable liquid wherein the virus is provided in minute particles including an actinic light absorber dispersed in a continuous liquid vehicle having dissolved therein a so-called "sticker" polymeric material; the "sticker" polymeric material being provided as an adhesive to maintain the particles of virus composition, once applied, in the desired location on the leaves of crop plants.

It is a further object of the invention to provide a method for using the above-described virus composition wherein the combination of virus and actinic light absorber is despersed in a liquid carrier vehicle and is applied by spraying, or by other convenient means, to agricultural areas where growing plant crops are present and, further, where infecting insects are or may be also present.

As a practical matter, in the wavelength range generally considered to be ultraviolet, it is rather difficult to differentiate between absorbing and reflecting materials and, for the purposes of this disclosure, materials utilized to either absorb or reflect actinic radiation will be referred to as absorbing materials. Actinic light absorbers may include materials which are transparent to normal visible light, such as polymeric materials with particular chemical groups or linkages, for example, double bonds or triple bonds. Of course, those mentioned chemical linkages and others absorb in the ultraviolet region. Dye compounds which are colored and which absorb in the visible portion of the spectrum may absorb actinic light either in the visible or ultraviolet region. There are a great number of well known light absorbing materials which may be dissolved or dispersed in polymeric binder or matrix materials in practicing the present invention. Other absorbers which may be used include solid particles of pigments or minerals such as carbon, in the form of soot or carbon black, metal flakes, metal oxide particles, metal sulphides, or other commonly used pigments which are known to reflect or absorb light both in the visible and in the ultraviolet regions of the light spectrum.

The composition of the persent invention, in one prefererred embodiment, utilizes a polymeric material to bind the actinic light absorbing compound and the virus particles together as minute particles, complete in themselves. Polymeric materials useful as the binder material in this invention, can be any commonly-used film-forming materials and can themselves be actinic light absorbers or not. Examples of polymeric materials eligible for use in the present invention include: polyvinyl acetate; polyvinyl chloride; polyethylene; polyvinyl alcohol; polystyrene; cellulose and cellulosic ethers, such as ethylcellulose; cellulosic esters such as cellulose acetate phthalate; ethylhydroxyethyl cellulose; copolymers, such as poly(ethylene-co-vinyl acetate); and other copolymers of the above-named polymeric materials; drying and curnig resins, such as alkyd resins, epoxy resins, polyurethane resins; and other film-forming drying oils commonly used to provide coating protection and/or carrier qualities for films and coatings. Other matrix materials might well include waxes, such as paraffinic waxes, halogenated, and hydrophilic colloidal materials, such as gelatin, gum arabic, zein, carrageenan, and hydrolyzed or, at least, partially hydrolyzed, maleic anhydride copolymers, such as poly(ethylene-co-maleic anhydride).

It is believed that, in at least some cases, the viruses used in the present invention must be ingested by insects to ensure that the insects be infected. The virus composition must, therefore, be provided as very small particles. The size of individual particles of virus composition generally used in practice of the persent invention can range from approximately 1 to approximately 100 microns or perhaps slightly larger.

The three elements of preferred compositions of the present invention can be combined in several different manners; the three elements being the virus, the actinic light absorbing material, and the polymeric binder material (matrix). Following are a few of the preferred three-element combinations:

(a) Individual particles of the virus and of the actinic light absorbing material are homogeneously distributed within minute entities of the polymeric matrix material;

(b) A multitude of individual particles of virus form a center or core and, surrounding that core, is a film of polymeric binder material which encloses the core. Homogeneously or substantially homogeneously dispersed throughout the surrounding film of polymeric binder material are particles of the actinic light absorbing material;

(c) A multitude of individual particles of the virus serve as the center or core of a single composition entity. That core is surrounded and endorsed by a film of polymeric binder material and the film of enclosing polymeric binder material is, in turn, surrounded and coated by minute particles of actinic light absorbing material; and (d) A multitude of individual particles of the virus and of individual particles of the actinic light absorbing material are substantially homogeneously combined to form a center or core of the virus composition entity. That core is surrounded and enclosed by a film of the polymeric binder material.

The four above-mentioned combinations of the various elements of composition of the present invention are not intended to be limiting and one skilled in the art can devise other, slightly different, preferred combination of the elements. The only requirement for such different, preferred, combinations being that there be provided individual particles of an appropriate insect virus, a polymeric binder material enclosing the individual virus particles and an actinic light-absorbing material in protective relation to the virus.

The sprayable composition of the present invention includes, along with minute particles of the virus and actinic light absorbing material in the polymeric binder, a liquid carrier vehicle which has dissolved therein a "sticker" material. In the usual case wherein the polymeric binder material is substantially water insoluble, the liquid vehicle is water or an aqueous solution and the sticker material is a water soluble polymeric material such as methyl cellulose or polyvinyl alcohol. Other sticker materials might be ethylhydroxy ethyl cellulose, gum arabic, gelatin or other hydrophilic polymeric material. In another embodiment wherein the polymeric binder material is slightly water soluble or water-swellable, an aqueous vehicle need not include a sticker material because the palymeric binder material itself is slightly swollen by the aqueous vehicle and serves as its own sticker. If, for some reason, it is desired or required to use, as the polymeric binder material, a completely water soluble polymeric material, the sprayable carrier vehicle can, of course, be an appropriate organic solvent. In such a case, an appropriate sticker material is a polymeric material soluble in the organic carrier vehicle, rather than a polymeric soluble in aqueous materials.

In any case, and whatever the composition of the carrier liquid, surfactants can be added to control the dispersibility of the virus-containing entities in the carrier liquid and to influence the spraying characteristics of the liquid composition as a whole. Such surfactants are commonly known and need not be listed herein.

DESCRIPTION OF PREFERRED EMBODIMENTS

Example I

The virus utilized in the present example was a Nuclear Polyhedrosis Virus effective in infecting corn earworms or, otherwise, known as bollworms. This particular virus preparation was provided by International Mineral and Chemical Corporation and was designated as Preparation Number VR70629. As a test, two different kinds of virus compositions were prepared, and each of the kinds of composition were prepared having two different ratios of virus to actinic light absorbing material. In this example, the actinic light absorbing material was carbon. One kind of virus composition was simply an admixture of virus with finely divided carbon particles; the carbon particles each having an approximate size of about 17 millimicrons. The admixtures of virus with carbon particles were prepared at a 50 to 1 ratio, by weight, of carbon to virus particles and at a 10 to 1, by weight, ratio of carbon to virus particles. The other kind of virus composition comprised enclosing particles of each of the 50 to 1 and the 10 to 1 admixtures within a matrix of ethylcellulose polymeric material. The resulting particles of virus and carbon enclosed within ethylcellulose were approximately 10 to 20 microns in average diameter. It should be noted that the individual virus particles have an approximate diameter of about 0.5 to about 15 microns depending upon the type of virus. Viruses in the present example had an average size of from about 0.5 to about 5 microns. The admixture of carbon and virus was prepared, in one case, by shaking ten parts, by weight, of carbon with one part, by weight, of the polyhedrosis virus, until a homogeneous combination of the materials was obtained. In the other case, 50 parts, by weight, of carbon were shaken with the one part polyhedrosis virus.

In binding the admixtures together with ethylcellulose polymeric material, ten grams of an admixture was added to 250 grams of a two percent, by weight, solution of ethylcellulose in toluene. The ethylcellulose was a kind having an ethoxyl content of approximately 48.5 percent, by weight, and a viscosity, in a 5 percent, by weight, solution of a 20 percent, by weight, ethyl alcohol in a toluene solvent system of 90 to 94 centipoises, at 25 degrees centigrade. The mixture of carbon and virus in the ethylcellulose solution was vigorously agitated in a Waring Blendor for approximately five minutes at which time about 100 grams of polybutadiene, having approximately 8000 to 10,000 molecular weight (as ascertained by an osmotic pressure method), was added to the agitating mixture as a phase-separation-inducing agent. The polybutadiene material was added slowly (approximately 5 grams per minute) and the agitating system was maintained at a temperature of about 25 degrees centigrade throughout the process. The agitation of the system was stopped and the liquid contents of the system were poured into a vessel containing approximately one liter of petroleum distillate No. 1 (a volatile aliphatic solvent). The ethylcellulose, on contact with the petroleum distillate, solidified to yield very small particles of ethylcellulose polymeric material having substantially homogeneously enclosed within the particles the admixture of carbon and polyhedrosis virus. The minute entities of ethylcellulose were then subjected to several wash cycles, using additional petroleum distillate No. 1, to completely remove residual amounts of the liquid polybutadiene material. After the washing cycles, the petroleum distillate was permitted to evaporate and the resulting, dried, free-flowing, powder of ethylcellulose particles containing virus and carbon were sieved through a screen having 44-micron openings to remove large chunks and agglomerated particles.

A test was devised to demonstrate the effectiveness of the composition of the present invention in protecting virus from the deactivating effects of sunlight. The carbon/virus admixtures and the carbon/virus admixtures protected by ethylcellulose were dispersed in water in a concentration of $10^8$ polyinclusion bodies per milliliter and were divided into two parts. One part was exposed for six hours to direct sunlight and the other part was exposed for six hours to the same sunlight shaded by aluminum foil. Aqueous dispersions of the unprotected virus, also at a concentration of $10^8$ polyinclusion bodies per milliliter, was exposed to six hours of sunlight and shade as controls. All of the virus-containing systems were then diluted and were used to dose *Heliothis zea* larvae in cups having 800 square millimeters of surface area. Amounts of the virus ranged from $10^4$ inclusion bodies per cup of larvae to $10^7$ inclusion bodies per cup of larvae in increasing orders of magnitude. The larvae were selected to be approximately 20 milligrams in weight and were placed three in each cup. In order to determine a percent mortality, as indicated by one entry in the following table, thirty cups of larvae were subjected to the test and the number of dead larvae were counted ten days after contact with the virus composition. The results of these tests are set out in the table below. Series I and Series II simply represent duplicate runs of the test under the same conditions.

| Virus Composition | Treatment | Virus inclusions/cup | | | |
|---|---|---|---|---|---|
| | | $10^4$ | $10^5$ | $10^6$ | $10^7$ |
| | Series I | Mortality (percent) | | | |
| Ethylcellulose 50:1 | Sun | 6.7 | 43.3 | 89.6 | 100.0 |
| | Shade | 13.3 | 56.7 | 89.3 | 96.2 |
| Admixture 50:1 | Sun | 30.3 | 70.0 | 100.0 | 100.0 |
| | Shade | 31.0 | 55.6 | 90.0 | 100.0 |
| Ethylcellulose 10:1 | Sun | 33.3 | 55.6 | 93.1 | ---- |
| | Shade | 6.7 | 16.7 | 90.0 | 95.5 |
| Admixture 10:1 | Sun | 10.3 | 53.3 | 96.6 | 100.0 |
| | Shade | 16.7 | 83.3 | 100.0 | 100.0 |
| V R70629 | Sun | 00.0 | 00.0 | 16.7 | 64.7 |
| Control | Shade | 3.4 | 36.7 | 89.7 | 95.2 |
| Untreated check | | No mortality | | | |
| | Series II | Mortality (percent) | | | |
| Ethylcellulose 50:1 | Sun | 6.7 | 26.7 | 40.0 | 72.7 |
| | Shade | 6.7 | 20.0 | 60.0 | 82.6 |
| Admixture 50:1 | Sun | 17.2 | 36.7 | 83.3 | 95.7 |
| | Shade | 3.3 | 30.0 | 80.0 | 87.5 |
| Ethylcellulose 10:1 | Sun | 00.0 | 13.8 | 70.0 | 100.0 |
| | Shade | 00.0 | 20.0 | 70.0 | 75.0 |
| Admixture 10:1 | Sun | 6.9 | 27.6 | 79.3 | 95.5 |
| | Shade | 13.3 | 34.5 | 70.0 | 90.0 |
| V R70629 | Sun | 00.0 | 00.0 | 3.5 | 8.0 |
| Control | Shade | 3.5 | 20.7 | 63.3 | 88.0 |
| Untreated check | | No mortality | | | |

It should be noted that larvae mortality occurred, for the most part, in from three to six days, and that the mortality rate peaked at five days, after exposure to the virus compositions.

Example II

In this example, the Nuclear Polyhedrosis Virus of Example I is combined with carbon of the same kind used in Example I in the ratio of 50 to 1, carbon to virus, and that admixture is combined with cellulose acetate phthalate as the polymeric binder material in the place of the ethylcellulose which was used in Example I. The reason for using cellulose acetate phthalate polymeric material to bind the material is that it becomes soluble in water above a pH of about 7 and migth more easily release the virus for use in infecting insects after being ingested by the insect. It is believed cellulose acetate phthalate will operate in an enteric fashion in the digestive tract of insect larvae wherein material in the digestive tract is alkaline. Another benefit in the use of cellulose acetate phthalate rather than ethylcellulose as the polymeric binder material, is that particles of cellulose acetate phthalate are much more easily dispersed in aqueous systems than are particles of ethylcellulose.

Example III

Viruses eligible for use in the present invention can be combined with very small particles of metal flakes to be used as actinic light absorbing and reflecting material;— an admixture of viruses and metallic flakes being bound together by a polymeric binder material. In this example, viruses and aluminum flakes having a size of less than about 1 micron in their major dimension are admixed in the ratio of 10 parts, by weight, aluminum flake and 1 part, by weight, polyhedrosis virus, to yield an admixture preparation of virus which virus is protected, in use, from the effects of actinic radiation. A portion of the admixture of 10 to 1, by weight, aluminum and virus was combined with ethylcellulose in the manner above-disclosed in Example I.

Example IV

In this example, the virus is dispersed in a substantially water immiscible oil or oily material which oil serves as a food for the larvae to be infected by the virus. An example of such an oil is cottonseed oil. That oil, containing virus, is encapsulated by using hydrophilic materials as capsule wall material. The capsules containing virus dispersed in, for example, cottonseed oil, can be manufactured by any well-known process for encapsulating water insoluble materials. Examples of such processes are disclosed and claimed in U.S. Pat. No. 3,190,837 issued June 22, 1965, on the application of Carl Brynko et al. and in U.S. Pat. No. 3,341,466 issued Sept. 12, 1967, to Carl Brynko et al. Such capsules are especially effective because they combine the virus, which mortally infects the insects, with food in the form of an oil to attract the insects.

Example V

In this example, a sawfly virus was combined with carbon particles as an actinic radiation absorber and with ethylcellulose as the polymeric binder material. The sawfly virus (*N. Sertifer*) was manufactured into two virus-containing compositions; one of the compositions including 9.1 percent, by weight, ethylcellulose as polymeric binder material in particels having an average size of about 10.5 microns, with virus and carbon particles substantially homogeneously distributed throughout each particle of ethylcellulose material. To prepare the above-mentioned composition, 170 milliliters of the sawfly virus in a concentration of $1.55 \times 10^9$ inclusion bodies per milliliter, were used to provide about $2.6 \times 10^{11}$ inclusion bodies of the virus. Those virus inclusion bodies were combined with 73.5 grams of carbon and 7.5 grams of ethylcellulose polymeric material as disclosed hereinabove in Example I. Another virus-containing composition was manufactured which contained 50 percent, by weight, ethylcellulose and had particles with an average size of about 9.6 microns and contained virus and carbon particles substantially homogeneously combined in the ethylcellulose binder. To make that composition, about $7.0 \times 10^{10}$ inclusion bodies of the sawfly virus were combined with 19.6 grams of carbon and 20 grams of ethylcellulose polymeric material.

It should be understood in the above disclosure and in the appended claims that what is considered as being novel and as a definite advance in the art in the present composition, is the use of a certain combination of elements in order to provide a composition of insect viruses protected from actinic light. The specific kind and type of virus is unimportant in the practice of the present invention with respect to the elements used in combination with the virus to provide protection from the deactivating effects of actinic light. What is considered to be the invention resides in the combination of actinic light absorbing material with a virus capable of infecting the larvae of insect pests; the combination being used as a long-acting insecticidal composition.

What is claimed is:

1. A virus composition in dosage form, sufficiently small enough to be ingested by the insects to be infected, ranging in overall size from about 1 to about 100 microns, for exerting a sustained or prolonged effectiveness in the presence of virus-deactivating actinic light in the wavelength range of from about 3900 to about 1000 Angstrom units, said dosage form being a predetermined viral dosage consisting of individual insect-infecting particles of an insect virus, susceptible to actinic light deactivation, enclosed by a polymeric material which per se does not inherently absorb and/or reflect sufficient actinic light to protect the insect virus against actinic light deactivation for use in infecing insects on growing plants comprising:

(a) individual particles of an insect virus;
   (b) a polymeric binder material enclosing the individual virus particles; and
   (c) an actinic light absorbing material positioned in protective relation to the virus.

2. A virus composition in dosage form, sufficiently small enough to be ingested by the insects to be infected, ranging in overall size from about 1 to about 100 microns, for exerting a sustained or prolonged effectiveness in the presence of virus-deactivating actinic light in the wavelength range of from about 3900 to about 100 Angstrom units, said dosage form being a predetermined viral dosage consisting of individual insect-infecting particles of an insect virus, susceptible to actinic light deactivation, enclosed by a polymeric material which per se does not inherently absorb and/or reflect sufficient actinic light to protect the insect virus against actinic light deactivation comprising:

(a) a particle of polymeric matrix material;
   (b) individual particles of an insect virus dispersed substantially homogeneously throughout the polymeric matrix material; and
   (c) actinic light absorbing material dispersed substantially homogeneously throughout the polymeric matrix material.

3. The virus composition of claim 2, wherein the light absorbing material absorbs ultraviolet radiation and wherein the virus is a polyhedrosis virus.

4. A virus composition in dosage form, sufficiently small enough to be ingested by the insects to be infected, ranging in overall size from about 1 to about 100 microns, for exerting a sustained or prolonged effectiveness in the presence of virus-deactivating actinic light in the wavelength range of from about 3900 to about 100 Angstrom units, said dosage form being a predetermined viral dosage consisting of individual insect-infecting particles of an insect virus, susceptible to actinic light deactivation, enclosed by a polymeric material which per se does not inherently absorb and/or reflect sufficient actinic light to protect the insect virus against actinic light deactivation comprising:

(a) a multitude of individual particles of insect virus;
   (b) polymeric material surrounding and enclosing the multitude of particles; and
   (c) actinic light absorbing material dispersed substantially homogeneously throughout the polymeric matrix material.

5. The virus composition of claim 4 wherein the light absorbing material absorbs ultraviolet radiation and wherein the virus is polyhedrosis virus.

6. A virus composition in dosage form, sufficiently small enough to be ingested by the insects to be infected, ranging in overall size from about 1 to about 100 microns, for exerting a sustained or prolonged effectiveness in the presence of virus-deactivating actinic light in the wavelength range of from about 3900 to about 100 Angstrom units, said dosage form being a predetermined viral dosage consisting of individual insect-infecting particles of an insect virus, susceptible to actinic light deactivation, enclosed by a polymeric material which per se does not inherently absorb and/or reflect sufficient actinic light to protect the insect virus against actinic light deactivation comprising:

(a) a multitude of individual particles of insect virus;
   (b) polymeric material surrounding and enclosing the multitude of particles; and
   (c) actinic light absorbing material surrounding and coating the outer aspect of the polymeric material.

7. The virus composition of claim 6 wherein the light absorbing material absorbs ultraviolet radiation and wherein the virus is polyhedrosis virus.

8. A virus composition in dosage form, sufficiently small enough to be ingested by the insects to be infected, ranging in overall size from about 1 to about 100 microns, for exerting a sustained or prolonged effectiveness in the presence of virus-deactivating actinic light in the wavelength range of from about 3900 to about 100

Angstrom units, said dosage form being a predetermined viral dosage consisting of individual insect-infecting particles of an insect virus, susceptible to actinic light deactivation, enclosed by a polymeric material which per se does not inherently absorb and/or reflect sufficient actinic light to protect the insect virus against actinic light deactivation comprising:

(a) an insect virus;
(b) actinic light absorbing material substantially homogeneously combined with the virus; and
(c) polymeric material surrounding and enclosing the virus combination of virus and actinic light absorbing material.

9. The virus composition of claim 8 wherein the light absorbing material absorbs ultraviolet radiation and wherein the virus is polyhedrosis virus.

10. A composition in dosage form, sufficiently small enough to be ingested by the insects to be infected, ranging in overall size from about 1 to about 100 microns, for exerting a sustained or prolonged effectiveness in the presence of virus-deactivating actinic light in the wavelength range of from about 3900 to about 100 Angstrom units, said dosage form being a predetermined viral dosage consisting of individual insect-infecting particles of an insect virus, susceptible to actinic light deactivation, enclosed by a polymeric material which per se does not inherently absorb and/or reflect sufficient actinic light to protect the insect virus against actinic light deactivation for controlling the infestation of insects on growing plants comprising:

(a) a liquid food for the larvae or insects to be infected by the virus, to attract the insects, or other sprayable carrier vehicle, in combination with a polymeric material, and
(b) particles of an insect virus in combination with an actinic light absorbing material.

11. The composition of claim 10 wherein the liquid vehicle includes the polymeric material in solution to serve as an adhesive for holding the particles of virus to the growing plants.

12. The composition of claim 10 wherein the virus and the actinic light absorbing material are held together, in combination, by the polymeric material.

References Cited
UNITED STATES PATENTS

| | | | |
|---|---|---|---|
| 2,853,797 | 9/1958 | Graham et al. | 34—5 |
| 2,897,600 | 8/1959 | Graham et al. | 34—5 |
| 2,946,724 | 7/1960 | Valentine | 424—89 |
| 3,072,528 | 1/1963 | Kludas et al. | 424—93 XR |
| 3,113,066 | 12/1963 | Emond | 424—93 |
| 3,178,350 | 4/1965 | Lund | 424—89 XR |
| 3,197,369 | 7/1965 | Widmann et al. | 424—37 XR |
| 3,317,393 | 5/1967 | Chanock et al. | 424—89 XR |
| 3,337,395 | 8/1967 | Page | 424—93 |
| 3,378,443 | 4/1968 | Cooper et al. | 424—89 |

SHEP K. ROSE, Primary Examiner

U.S. Cl. X.R.

424—19, 20, 21, 22, 32, 33, 35, 36, 39, 77, 78, 83, 84, 93